United States Patent [19]

Ono et al.

[11] Patent Number: 4,941,140
[45] Date of Patent: Jul. 10, 1990

[54] OPTICAL DISC PLAYER

[75] Inventors: Takuro Ono; Noboru Aoyama; Kaoru Morinaga, all of Yokohama, Japan

[73] Assignee: Kabushiki Kaisha Toshiba, Kanagawa, Japan

[21] Appl. No.: 306,900

[22] Filed: Feb. 7, 1989

Related U.S. Application Data

[63] Continuation of Ser. No. 89,337, Aug. 25, 1987, Pat. No. 4,914,647.

[30] Foreign Application Priority Data

Aug. 25, 1986 [JP] Japan ................................ 61-198426
Aug. 25, 1986 [JP] Japan ................................ 61-129071

[51] Int. Cl.$^5$ .......................... G11B 17/04; G11B 1/00
[52] U.S. Cl. ................................. 369/264; 369/77.2; 369/270
[58] Field of Search ................. 369/77.2, 77.1, 270, 369/263, 264

[56] References Cited

U.S. PATENT DOCUMENTS

| | | | |
|---|---|---|---|
| 3,484,111 | 12/1969 | Staar | 369/77.1 |
| 4,439,851 | 3/1984 | Kiguchi | 369/263 |
| 4,507,768 | 3/1985 | Ikedo et al. | 369/263 |
| 4,680,748 | 7/1987 | Kobayashi | 369/264 |

Primary Examiner—Steven L. Stephan
Attorney, Agent, or Firm—Finnegan, Henderson, Farabow, Garrett, and Dunner

[57] ABSTRACT

An optical disc player for playing optical discs includes a disc compartment for accommodating an optical disc, a disc holding mechanism for holding an optical disc accommodated in the disc compartment, a disc rotation drive mechanism for rotating the optical disc held by the disc holding mechanism, an optical pickup device which is radially movable in respect to the optical disc rotated by the disc rotation drive mechanism for optically tracing the optical disc and a pickup locking mechanism which is responsive to the disc holding mechanism for locking the optical pickup device during a non-operation of the tracing operation.

3 Claims, 14 Drawing Sheets

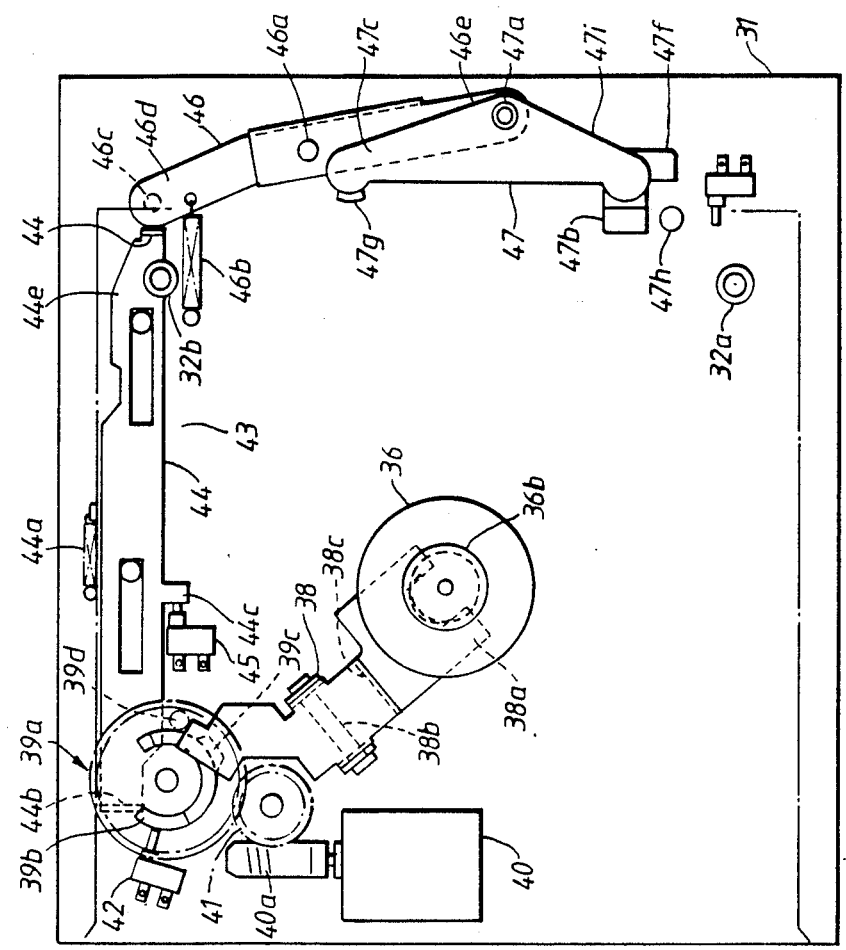
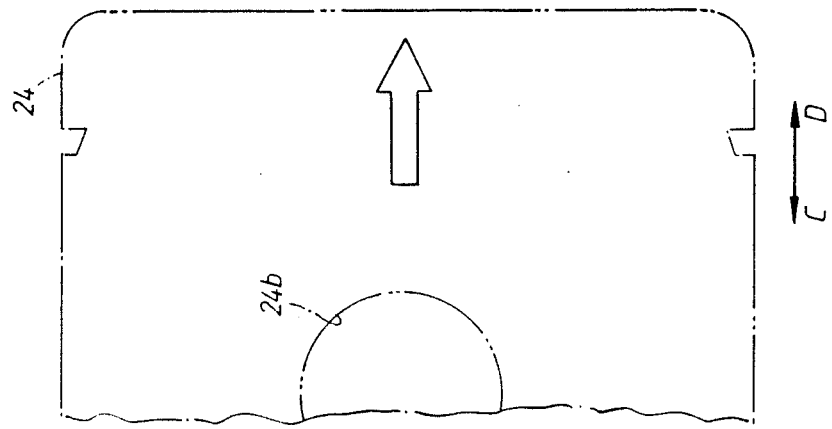
Fig. 5(a).

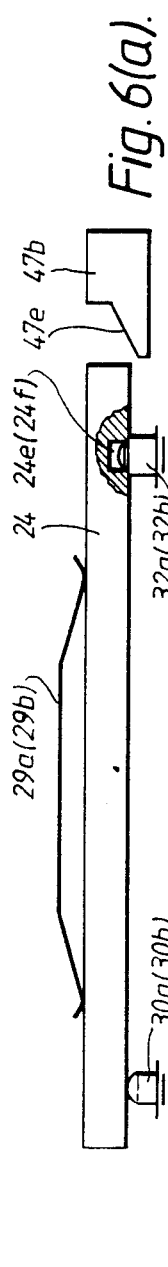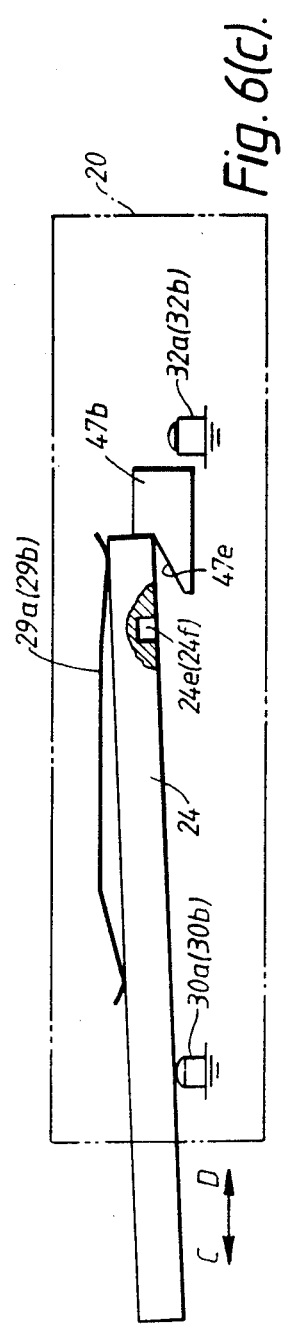

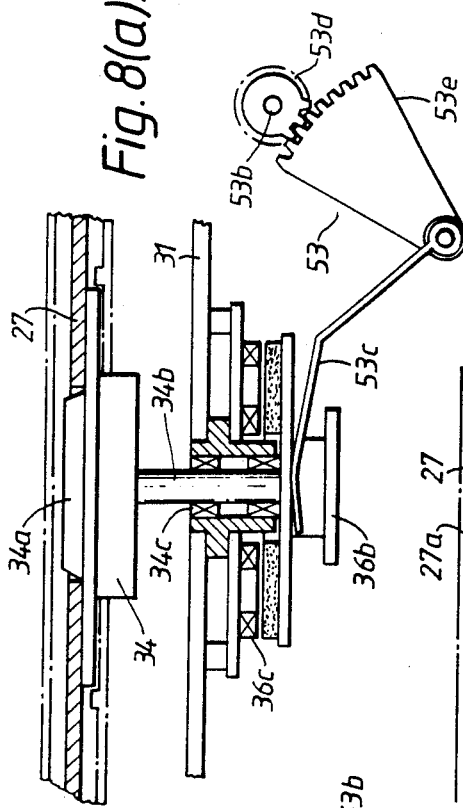
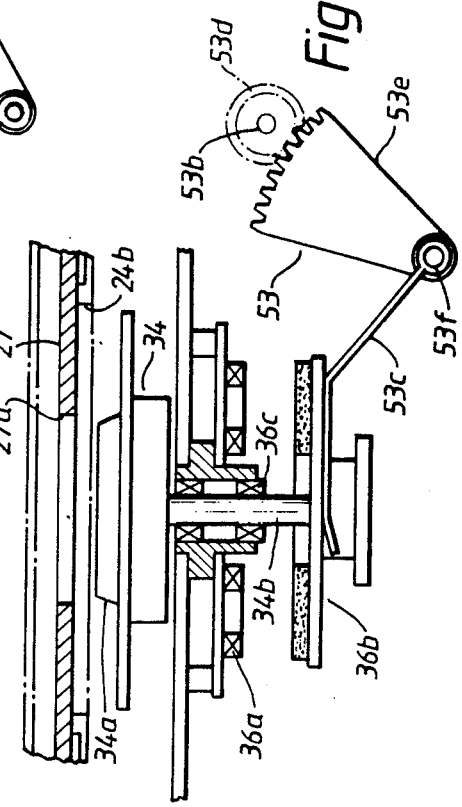
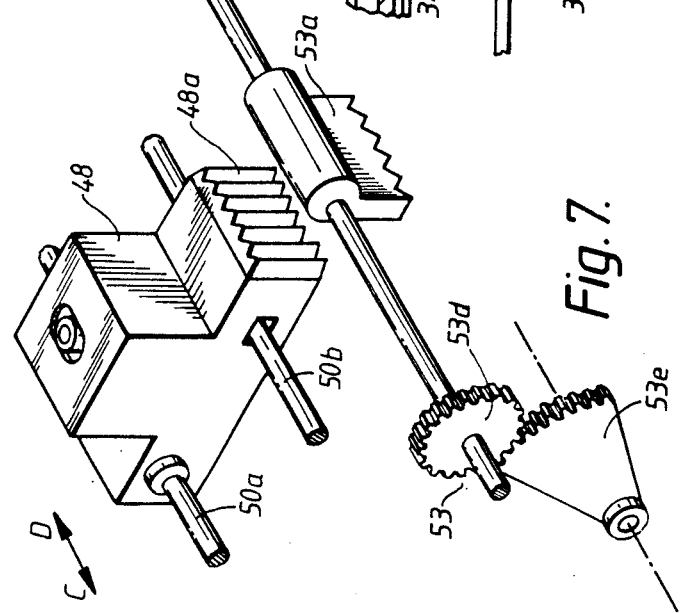

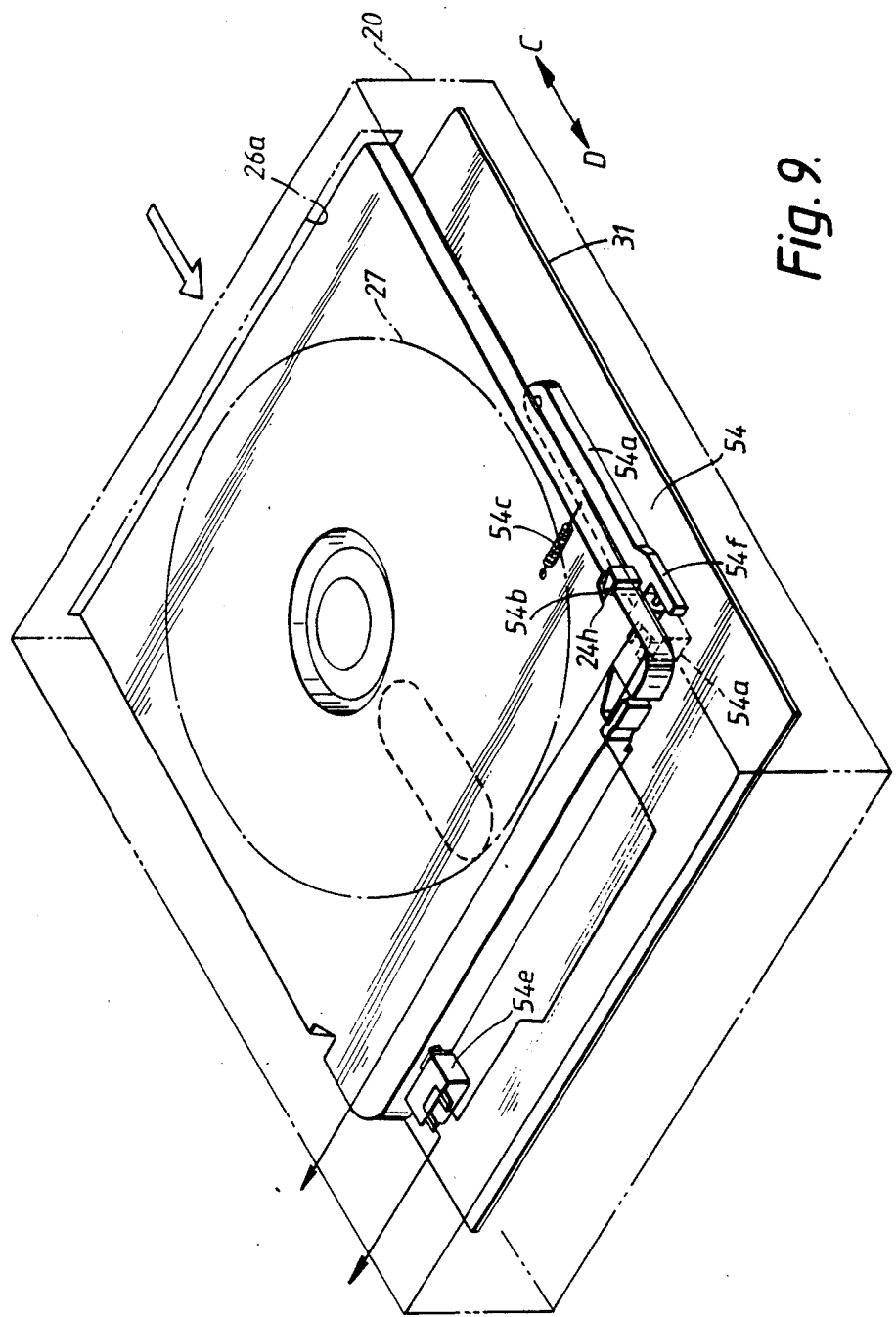

OPTICAL DISC PLAYER

This is a continuation of application Ser. No. 089,337, filed Aug. 25, 1987 now U.S. Pat. No. 4,914,647.

BACKGROUND OF THE INVENTION

1. Field of the Invention

The present invention relates to optical disc players that are suitable for playing back optical discs such as audio discs and/or video discs and, more particularly, to protection systems for optical disc players.

2. Description of Related Art

Recently, in the field of record disc equipments, digital audio disc and/or video disc playback systems utilizing pulse code modulation (PCM) technology to playback sound and/or video image as faithfully as possible have been developed. Of these systems, audio disc playback systems employing compact discs (trade name) and video disc playback systems employing laser discs (trade name) have become especially popular.

The compact disc (referred as CD hereafter), for example, conventionally used in a digital audio disc playback system is made from a transparent resin and has a diameter of approximately 12 cm and a thickness of approximately 1.2 mm. The CD has a thin metal film deposited on at least one disc surface, and pits or depressions are formed in the thin metal film. The pits of depressions produce light reflectivities that are different from the reflectivity of the non-pitted portions of the metal film and that correspond to 1 or 0 digitized data. The pits and the non-pitted portions are alternatively lined in a form of spiral or concentric pit train or track in the information storage area of the CD. When a signal is read out from a CD, the CD is rotated at a variable rotation speed between 200 and 500 rpm. An optical pickup incorporating a semiconductor laser or photoelectric transducing device traces the pit train or track of the rotating CD with constant linear velocity while moving radially from the center portions toward the outer portions A CD stores such a large quantity of information that a single side can provide approximately one hour of stereophonic music. A CD is far superior to a conventional analog phonograph record in sound quality, information storage density, and applicability to sophisticated control facilities.

Generally, CD players have a precise machanical construction for playing back such a large quantity of information. Conventional CD players intended, for example, for home use and or portable outdoor use, however, do not possess sufficient mechanical durability to satisfy the demand for adequate operating flexibility and simplicity. For example, conventional CD players are provided with an optical pickup and a pickup actuator for moving the optical pickup radially in respect of a CD.

The pickup actuator is usually constructed in using a linear drive type motor comprised of a linear guide member, a moving member movable along the guide member and a stator member for driving the movable member. As is well known, in the linear motor the moving portion is controlled its movement by the stator portion in operating state of the motor. As a result, the position of the moving portion is controlled during the operating state of the motor. However, the moving member is free to move in the nonoperating state of the motor. Therefore, optical pickups or pickup actuators must be locked mechanically for not moving during a transportion and/or a carriage of CD players. Otherwise the optical pickups or pickup actuators bump into guide ends due to exterior forces given in the transportion and/or the carriage so that they are damaged easily.

Optical pickups or pickup actuators, of course, are mechanically locked by manufacture or users prior to the transportation or the carriage to protect them from damage. However, there occur easily unlockings or incomplete lockings of optical pickups or pickup actuators by obilivion.

SUMMARY OF THE INVENTION

An object of the present invention is to provide an optical disc player possessing sufficient mechanical durability to satisfy the demand for adequate operating flexibility and simplicity..

Another object of the present invention is to provide an optical disc player capable of protecting the player from damage in transportation or carriage of the player.

A further object of the present invention is to provide an optical disc player capable of automatically locking optical pickup in the non-operating state.

Additional objects and advantages of the present invention will be set forth in part in the description that follows and in part will be obvious from that description or can be learned by practice on the invention. The objects and advantages of the present invention can be realized and obtained by the apparatus particularly pointed out in the appended claims.

The present invention overcomes the problem of prior art optical disc players by providing a lock mechanism which automatically responds to operations or non-operations of the players.

To overcome the the problem of prior art and in accordance with the purpose of the invention, as embodied and broadly described herein, the optical disc player of the present invention comprises a disc compartment for accomodating an optical disc, a disc holding mechanism for holding the optical disc accomodated in the disc compartment, a disc rotation drive mechanism for rotating an optical disc held by the disc holding mechanism, an optical pickup device which is radially movable in respect to the optical disc rotated by the disc rotation drive mechanism for optically tracing the optical disc and a pickup locking mechanism which is responsive to the disc holding mechanism for locking the optical pickup device during a non-operation of the tracing operation.

BRIEF DESCRIPTION OF THE DRAWINGS

The accompanying drawings, which are incorporated in and which constitute a part of this specification, illustrate at least one embodiment of the invention and, together with the description, explain the principles of the invention.

FIGS. 5(a), 5(b), 5(c), 5(d), 5(e), 5(f) and 5(g) are flat views showing the ejection mechanism of the CD player of FIG. 1;

FIGS. 6(a), 6(b) and 6(c) are sectional side elevations showing the ejection mechanism of the CD player of FIG. 1; and FIG. 7 is a perspective view showing a pickup lock mechanism of the CD player of FIG. 1;

FIGS. 8(a) and 8(b) are sectional side elavations showing the working of the lock drive mechanism for driving the lock mechanism of FIG. 7;

FIG. 9 is a perspective view showing a disc-case lock mechanism of the CD player of FIG. 1;

DESCRIPTION OF THE PREFERRED EMBODIMENT

Reference now will be made in detail to the presently preferred embodiments of the invention, examples of which are illustrated in the accompanying drawings, i.e., FIG. 1 through 11. Throughout the drawings, like references numerals and letters are used to designate like or equivalent elements for the sake of simplicity of explanation.

Figure 1:
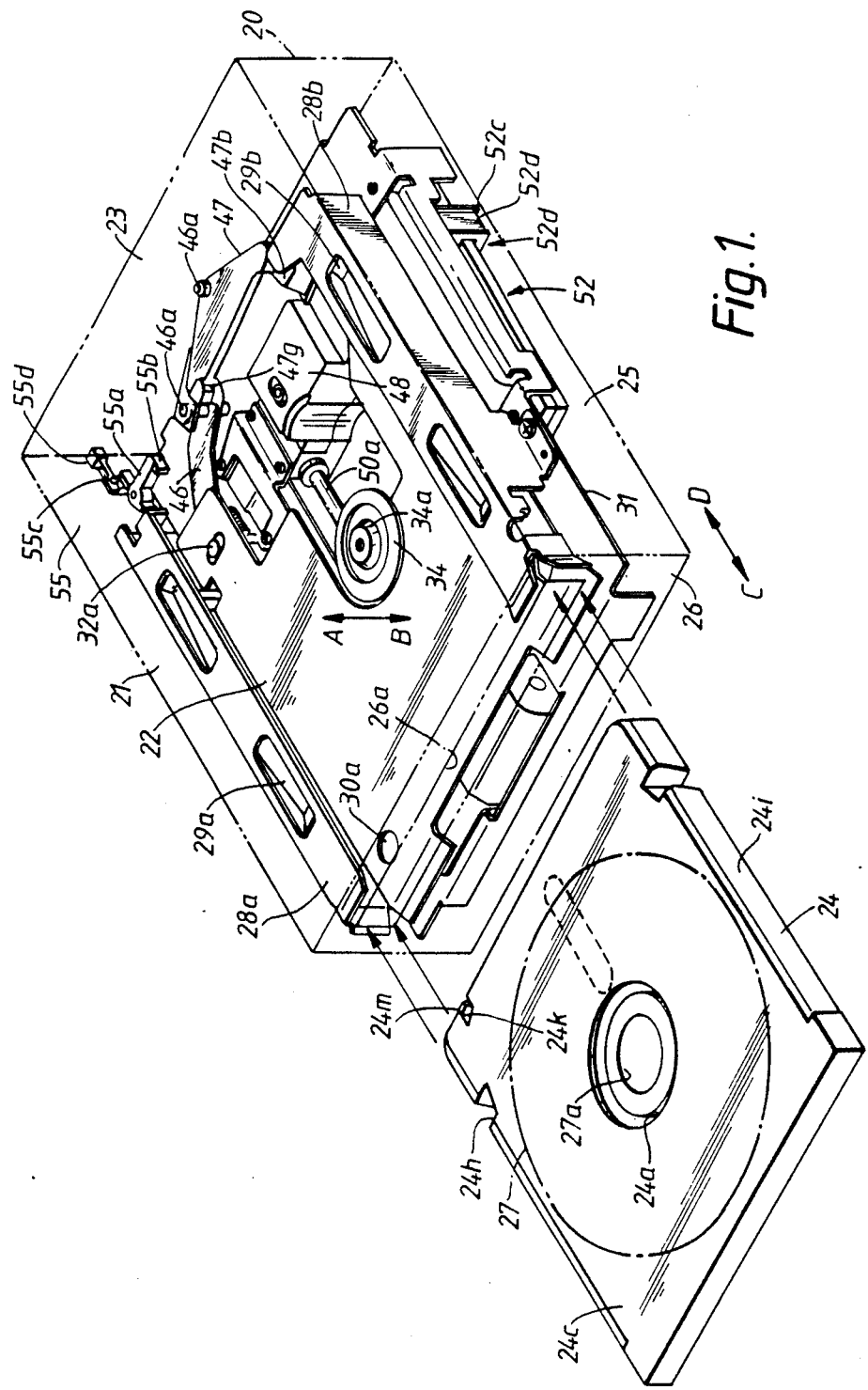
FIG. 1 is a perspective view showing a top of a CD player according to the invention.
Figure 2:
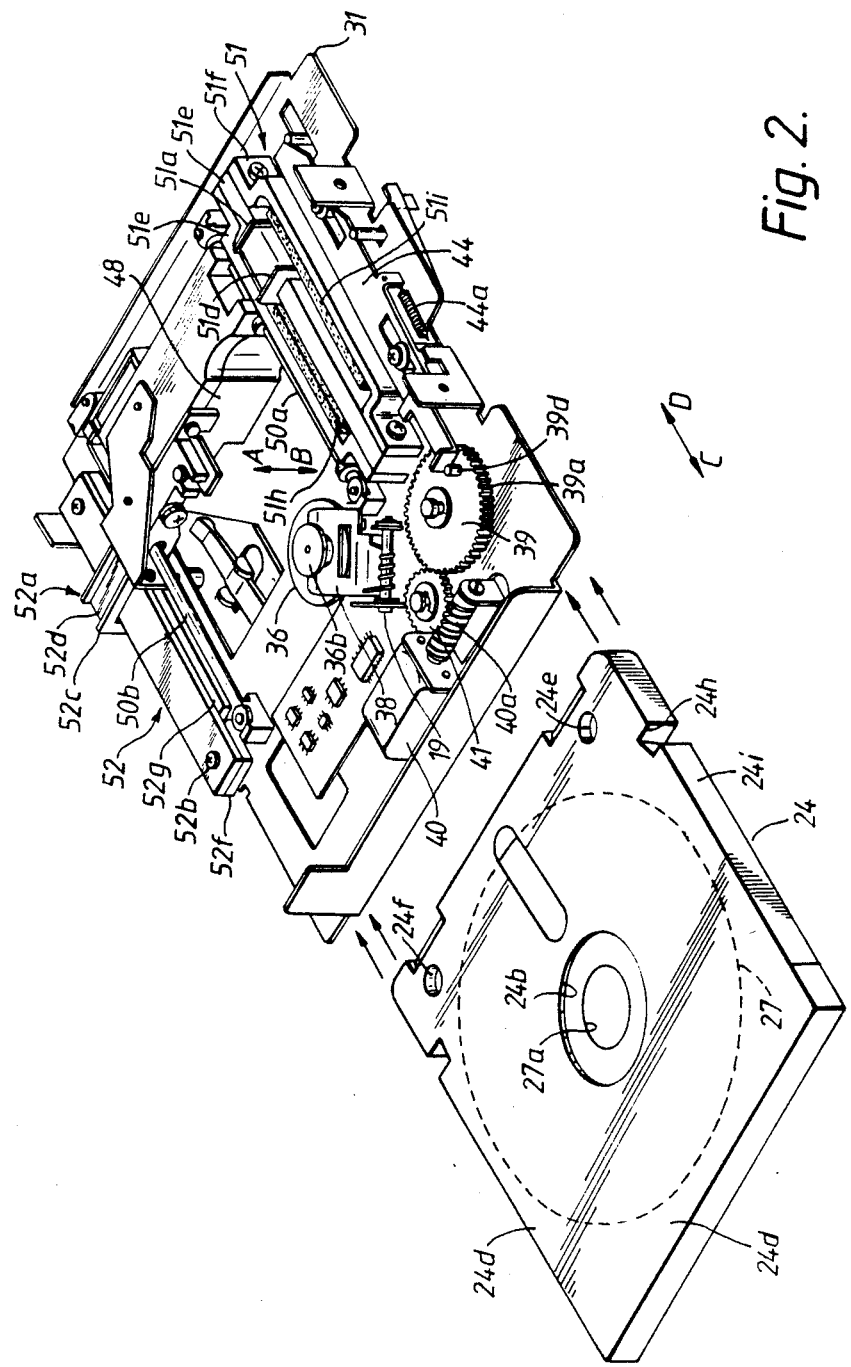
FIG. 2 is a perspective view showing a bottom of the CD player of FIG. 1 with the cover removed.

FIGS. 1 and 2 show perspective views of top and bottom of a CD player according to an embodiment of the present invention, respectively. The CD player makes possible the playback of CDs which are packed in disc-cases. That is, CDs are loaded into the player together with their disc-cases. As shown in FIG. 1, a cover 20 encloses a CD playback deck 21. CD playback deck 21 is diveded by a disc-case receiving chassis 22 into two sections, a disc compartment 23 of the upper part of CD playback deck 21 for accommodating a disc-case 24 and a mechanism compartment 25 of the lower part of CD playback deck 21 for accommodating a variety of mechanisms as described below, respectively. Cover 20 has a front panel 26 formed a disc loading slot 26a through which disc-case 24 is loaded into or unloaded from disc compartment 23. Disc-case 24 houses therein a CD 27 with a center hole 27a. Disc-case 24 is formed apertures 24a and 24b in its top and bottom walls 24c and 24d in correspondence to center hole 27a of CD 27 housed in disc-case 24.

Referring now to FIGS. 1 and 2, disc compartment 23 will be described. Disc compartment 23 is comprised of disc-case receiving chassis 22 and a pair of guide rails 28a and 28b. Guide rails 28a and 28b are provided in the left and right sides of disc compartment 23 along the direction of arrows C and D. Guide rails 28a and 28b guide the slide movements of disc-case 24 for the loading and unloading operations thereof (see FIGS. 3 and 6). Guide rails 28a and 28b are provided with leaf springs 29a and 29b. Leaf springs 29a and 29b correspond to disc-case receiving chassis 22 so that they engage with top wall 24c of disc-case 24 when disc-case 24 loaded in the disc compartment 23. A pair of support pins 30a and 30b are mounted on a main chassis 31, which is in mechanism compartment 25 as described below, in correspondence to the front ends of guide rails 28a and 28b, respectively. Support pins 30a and 30b extend into disc compartment 23 so that they engage with bottom wall 24d of disc-case 24 for supporting disc-case 24.

Further a pair of positioning pins 32a and 32b are provided on main chassis 31 in correspondence to the rear ends of guide rails 28a and 28b, respectively. Positioning pins 32a and 32b correspond to recesses 24e and 24f formed on the rear part of the bottom wall 24d of disc-case 24 so that positioning pins 32a and 32b fit into recesses 24e and 24f when disc-case 24 is loaded in the right position of disc compartment 23. Disc-case 24 is positioned in its right plane position in disc compartment 23 by the engagements of recess 24e with positioning pin 32a and recess 24f with positioning pin 32b, respectively. While, disc-case 24 is supported in its right height position in disc compartment 23 by guide rails 28a, 28b and positioning pins 32a, 32b. Leaf springs 29a and 29b presses downwardly disc-case 24 so that disc-case 24 is held stably in its right position.

Figure 3A:
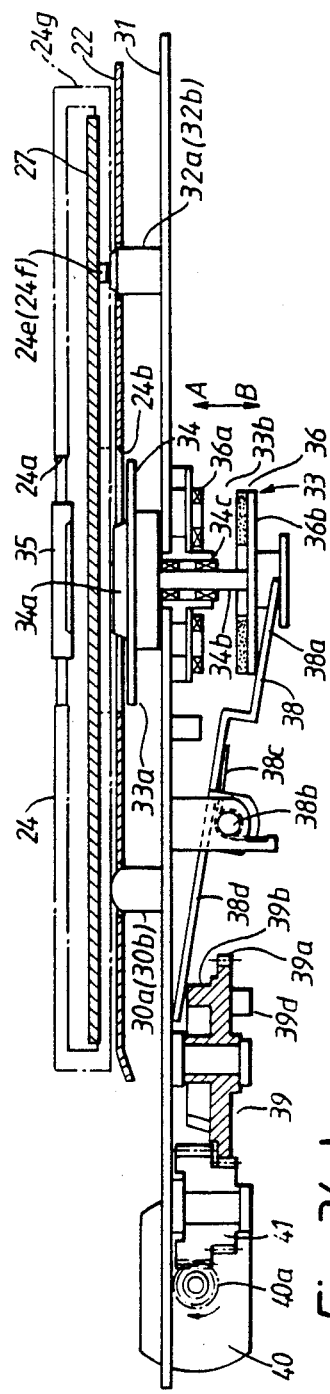
FIGS. 3(a) and 3(b) are sectional views showing the CD player of FIG. 2.
Figure 3B:
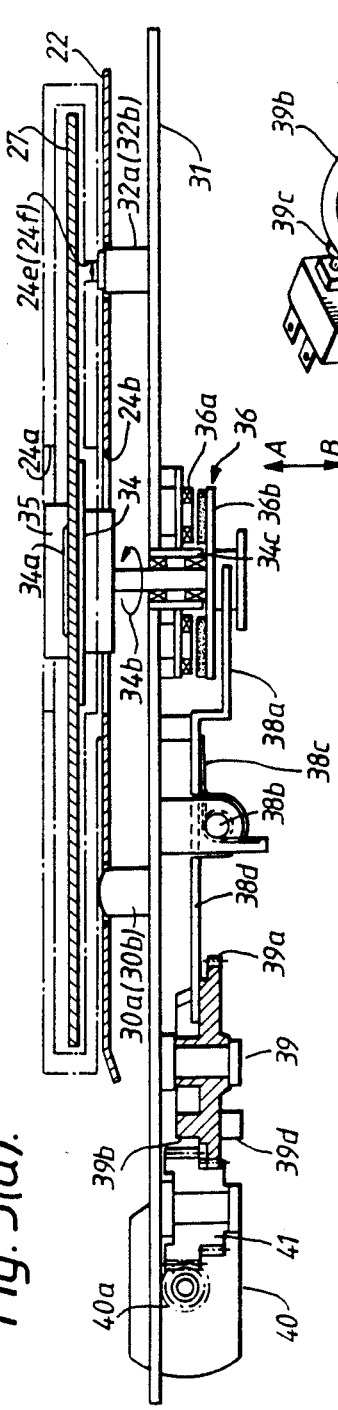

Referring now to FIGS. 3(a) and 3(b), a disc rotation drive mechanism 33 will be described. Disc rotation drive mechanism 33 is comprised of a disc holding section 33a and a disc rotating section 33b. Disc holding section 33a is mainly provided in disc compartment 23, while disc rotating section 33b is provided in mechanism compartment 25. Disc holding section 33a has a turntable 34 which is mounted to main chassis 31. Turntable 34 is rotatable in a plane parallel to main chassis 31 and slidable in the direction perpendicular to main chassis 31, for example, the direction shown by arrows A and B in the drawings. Turntable 34 enters into disc-case 24 through a cutting part 22a of disc-case receiving chassis 22 when it moves in the direction of arrow A. As a result, turntable 34 is able to intrude in disc-case 24 through aperture 24b and engages with CD 27 when disc-case 24 is loaded in disc compartment 23. Disc holding section 33a also has a clamper 35 which is movably provided in disc compartment 23 in correspondence with 34. clamper 35 also enters into disc-case 24 through aperture 24a and engages with CD 27 so that clamper 35 and turntable 34 holds CD 27 when turntable 34 moves upward in the direction of arrow A. Turntable 34 has a center boss 34a which fits into center hole 27a of CD 27 and clamper 35. As a result, CD 27 is adjusted its rotation axis to the rotation axis of turntable 34.

Disc rotating section 33b has a motor 36 for rotating turntable 34 through a turntable shaft 34b. Motor 36 is comprised of a stator 36a fixed to main chassis 31 and a rotor 36b. Rotor 36b is coupled to turntable shaft 34b. turntable shaft 34b is supported by main chassis 31 through a bearing 34c so that turntable shaft 34b is rotatable in the plane parallel to disc-case receiving chassis 22 and slidable along its axis. i.e., in the direction of arrows A and B. Rotor 36b is coupled to a turntable elavation mechanism 37. Turntable elevation mechanism 37 has an elavation lever 38 of which a rear end 38a engages with rotor 36b of motor 36. Elevation lever 38 is rockably supported to main chassis 31 through a pin 38b. A spring 38c is mounted between elavation lever 38 and pin 38b so that elavation lever 38 is biased in the clockwise direction in the drawings. A front end 38d of elavation lever 38 engages with a cam member 39 which is rotatably supported to main chassis 31.

Figure 4:
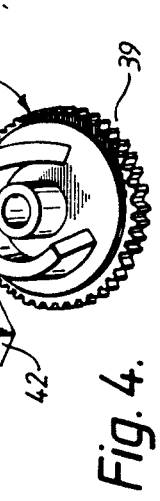
FIG. 4 is a perspective view showing the cam member and the switch of the CD player of FIG. 1.

Cam member 39 has a gear member 39a and a rotary cam 39b formed on the top of gear member 39a, as shown in FIG. 4. Gear member 39a is coupled to a cam drive motor 40 through an idler gear 41. Idler gear 41 is engaged with a worm gear 40a fixed to a motor shaft of cam drive motor 40. Mutual connections among elavation lever 38, cam member 39, cam drive motor 40 and idler gear 41 are illustrated in flat drawings of FIGS. 5(a) through 5(g). Cam member 39 also has a switch operation boss 39c which extends radially from rotary cam 39b. A mode detection switch 42 is mounted on main chassis 31 in the neighbor of cam member 39 so that mode detection switch 42 is engagable with rotary cam 39b and switch operation boss 39c.

Referring now to FIGS. 5(a) through 5(g), a disc ejection mechanism 43 will be described. Disc ejection mechanism 43 is provided at a left side of mechanism compartment 25 (upper part of the drawings FIGS. 5(a) through 5(g)). Disc ejection mechanism 43 has a ejection slider 44 which is slidably mounted on disc-case receiving chassis 22 along the direction of arrows C and D in the drawings. Ejection slider 44 is biased in the direction of arrow C by a spring 44a which is suspended between disc-case receiving chassis 22 and ejection slider 44. A front end 44b of ejection slider 44 corresponds to a projection 39d which is formed on the bottom of gear member 39a. Ejection slider 44 also has a switch operation projection 44c which extends perpendicularly from ejection slider 44. A slider position detection switch 45 is provided in mechanism compartment 25 in the neighbor of ejection slider 44 so that switch operation projection 44c turns ON slider position detection switch 45 when ejection slider 44 moves in the direction of arrow C. Ejection slider 44 formed an engaging part 44d on its rear end 44e.

Disc ejection mechanism 43 also has a first and second disc ejection levers 46 and second disc ejection lever 47. First and second disc ejection levers 46 and second disc ejection lever 47 are provided in a rear part of mechanism compartment 25 (right part of the drawings of FIGS. 5(a) through 5(g)). First disc ejection lever 46 is rockably mounted on main chassis 31 through a support pin 46a. A spring 46b is suspended between main chassis 31 and first disc ejection lever 46 so that first disc ejection lever 46 is biased in the anti-clockwise direction in the drawings. First disc ejection lever 46 is provided with an engaging pin 46c on its left end 46d. Engaging pin 46c corresponds to engaging part 44d of ejection slider 44 so that engaging pin 46c engages with engaging part 44d when first disc ejection lever 46 rotates in the anti-clockwise direction in accordance with the biasing force of spring 46b. Second disc ejection lever 47 is rockably mounted at its center portion to a right end 46e of first disc ejection lever 46. Second disc ejection lever 47 is mounted to right end 46e through a support pin 47a which extends upwardly into disc compartment 23 from right end 46e of first disc ejection lever 46. As a result, second disc ejection lever 47 is placed in disc compartment 23. Second disc ejection lever 47 is provided with a disc-case lifting member 47b on its right end 47c.

Referring now to FIGS. 6(a) to 6(c), disc-case lifting member 47b will be described. Disc-case lifting member 47b is formed a sloped part 47d which extends in the direction of arrow C in the drawings. A slope 47e of sloped part 47d corresponds to a bottom edge of a rear wall 24g of disc-case 24. Slope 47e engages with the bottom edge of rear wall 24g when disc-case lifting member 47b moves in the direction of arrow C so that the rear end of disc-case 24 is raised by sloped part 47d, as shown in FIG. 6(b).

Second disc ejection lever 47 also is provided with an engaging member 47f and a disc-case pushing member 47g. engaging member 47f extends from right end 47c of second disc ejection lever 47 in the right direction. Engaging member 47f corresponds to a stop pin 47h which is fixed to main chassis 31 in front of engaging member 47f. Engaging member 47f engages with stop pin 47h when disc ejection mechanism 43 moves in the direction of arrow C so that right end 47c of second disc ejection lever 47 is restricted its movement in the direction of arrow C by stop pin 47h. Disc-case pushing member 47g extends from a left end 47i of second disc ejection lever 47 in the direction of arrow C. Disc-case pushing member 47g corresponds to 24g of disc-case 24 so that disc-case pushing member 47g pushs disc-case 24 when second disc ejection lever 47 moves in the direction of arrow C.

Referring now to FIGS. 5(a) to 5(g), the operation of disc ejection mechanism 43 will be described. When a stop key or button (not shown) is operated by a user, motor 36 is stopped so that the playback operation ends. Simultaneously, cam drive motor 40 again is activated. Cam drive motor 40 drives gear member 39a through worm gear 40a and idler gear 41 so that gear member 39a rotates in the clockwise direction in the drawing. In accordance with the rotation of gear member 39a, rotary cam 39b rocks elavation lever 38 in the clockwise direction against spring 38c so that turntable 34 lowers in the direction of arrow B. As a result CD 27 is released from the clamped condition by turntable 34 and clamper 35. Further, projection 39d engages with engaging part 44d of ejection slider 44 in accordance with the rotation of gear member 39a so that ejection slider 44 slides in the direction of arrow D against spring 44a. Then, rear end 44e of ejection slider 44 engages with engaging pin 46c of first disc ejection lever 46 so that first disc ejection lever 46 rotates in the clockwise direction against spring 46b. In accordance with the rotation of first disc ejection lever 46, second disc ejection lever 47 moves in the direction of arrow C. Then, sloped part 47d of second disc ejection lever 47 engages with the bottom edge of rear wall 24g of disc-case 24 so that the rear part of disc-case 24 is raised against leaf springs 29a and 29b.

Referring now to FIGS. 1 and 2, an optical pickup 48 and an actuator 49 for moving optical pickup 48 will be described. Optical pickup 48 is provided in the rear part of mechanism compartment 25 in the neighbor of ejection slider 44. Optical pickup 48 is slidably supported by a pair of guide rods 50a and 50b. Guide rods 50a and 50b are mounted on main chassis 31 along the direction of arrows C and D so that optical pickup 48 mOves radially in respect of CD 27 when disc-case 24 is loaded in disc compartment 23. Actuator 49 is comprised of a conventional linear drive type motor 51 and also a conventional speed detector 52. Linear drive type motor 51 and speed detector 52 are provided in the left and right sides of mechanism compartment 25 along the direction of arrows C and D, respectively, and coupled to optical pickup 48.

Linear drive type motor 51 is comprised of a moving coil 51a and a stator 51b. Moving coil 51a is coupled to 48, while stator 51b is fixed to main chassis 31. Moving coil 51a has a bobbin 51c and a coil 51d wound on bobbin 51c. Stator 51b has a center yoke 51e, a pair of side yokes 51f and 51g and a pair of magnets 51h and 51i. Magnets 51h and 51i are magnetized in their perpendicular directions center yoke 51e supports moving coil 51a so that moving coil 51a moves along center yoke 51e. Side yokes 51f and 51g are coupled their respective ends to the ends of center yoke 51e. Magnets 51h and 51i are fixed to the middle parts of side yokes 51f and 51g, respectively, so that magnets 51h and 51i correspond to center yoke 51e. Stator 51b applies two magnetic fluxes to moving coil 51a so that moving coil 51a moves along center yoke 51e when a drive current is applied to coil 51d.

Speed detector 52 is comprised of a moving coil 52a and a stator 52b. Moving coil 52a is coupled to optical pikup 48, while stator 52b is fixed to main chassis 31. Moving coil 52a has a bobbin 52c and a coil 52d wound on bobbin 52c. Stator 52b has a pair of yokes 52e and 52f and a magnet 52g. Magnet 52g also is magnetized in its perpendicular direction. One of the yokes, e.g., 52e supports moving coil 52a so that moving coil 52a moves along yoke 52e. Yokes 52e and 52f are coupled their respective ends to each other. Magnet 52g is fixed to the middle part of the other yoke. Stator 52b applies magnetic fluxes to moving coil 52a so that coil 52d generates a current corresponding to a moving speed of moving coil 52a when moving coil 52a moves along yoke 52e in accordance with optical pickup 48. The detection current of moving coil 52a is used for servo control of linear drive type motor 51. By the way, linear drive type motor 51 and speed detector 52 are related to each other so that the magnetization direction of magnet 52g is perpendicular to those of magnets 51h and 51i for reducing their mutual magnetic influence.

Referring now to FIGS. 7, 8(a) and 8(b), a pickup lock mechanism 53 will be described. As shown in FIG. 7, optical pickup 48 is formed a first rack 48a in its one side. Pickup lock mechanism 53 is provided in the neighbor of optical pickup 48. Pickup lock mechanism 53 has a second rack 53a which corresponds to first rack 48a of optical pickup 48. Second rack 53a is rockably supported to main chassis 31 through a shaft 53b. Shaft 53b is coupled to a rock lever 63c through a pair of gears 53d and 53e. Gear 53d is fixed to shaft 53b while gear 53e is fixed to rock lever 53c. Rock lever 53c is rockably supported to main chassis 31 through a shaft 53f, as shown in FIGS. 8(a) and 8(b). The end of rock lever 53c is coupled to rotor 36b of motor 36.

Turntable 34 and rotor 36b are lowered when the playback operation of the playback deck for CDs is stopped as shown in FIG. 8(b). Rock lever 53c is rocked in the anti-clockwise direction in response to the downward movement of rotor 36b. Rock lever 53c rotates second rack 53a in the clockwise direction through gears 53e, 53d and shaft 53b so that second rack 53a engages with first rack 48a of optical pickup 48. As a result, optical pickup 48 is locked by pickup lock mechanism 53. Pickup lock mechanism 53 holds the lock of optical pickup 48 during the state in that turntable 34 is lowered. Turntable 34 is held in the lowered position in the non-operation state of the CD player so that optical pickup 48 is securely protected from damages in transportation or carriage of the player.

Turntable 34 and rotor 36b are raised in the direction of arrow A when the playback deck starts the playback operation of CDs. Rock lever 53c is rocked in the clockwise direction in response to the upward movement of rotor 36b. Rock lever 53c rotates second rack 53a in the anti-clockwise direction through gears 53e, 53d and shaft 53b so that second rack 53a disengages from first rack 48a of optical pickup 48. As a result, optical pickup 48 is unlocked from pickup lock mechanism 53. Optical pickup 48 is free to move for tracing CDs during the playback operation Referring now to FIGS. 9, 10(a), 10(b) and 10(c), a disc-case lock mechanism 54 will be described. Disc-case lock mechanism 54 locks disc-case 24 in the disc compartment 23 during the playback operation of CDs so that disc-case 24 is secured in disc compartment 23. Disc-case lock mechanism 54 has a lock lever 54a which is rockably mounted to main chassis 31 in the left side of disc compartment 23. Lock lever 54a is formed a projection 54b which corresponds to a recess 24h formed on a left side wall 24i of disc-case 24 when disc-case 24 is loaded in disc compartment 23. A spring 54c is suspended between lock lever 54a and main chassis 31 so that lock lever 54a is biased in the clockwise direction in the drawing. As a result, projection 54b engages with recess 24h of disc-case 24 to lock disc-case 24 in disc compartment 23 when disc-case 24 is loaded in disc compartment 23. Disc-case lock mechanism 54 also has a lock detection switch 54d and a disc case detection switch 54e. Lock detection switch 54d is provided in the left side of disc compartment 23 in the neighbor of lock lever 54a. While disc-case detection switch 54e is provided in the rear part of disc compartment 23. Lock lever 54a is formed a switch operation member 54f which corresponds to lock detection switch 54d. Switch operation member 54f engages with recess 24h of disc-case 24 when disc-case 24 is loaded in disc compartment 23.

Figure 10A:
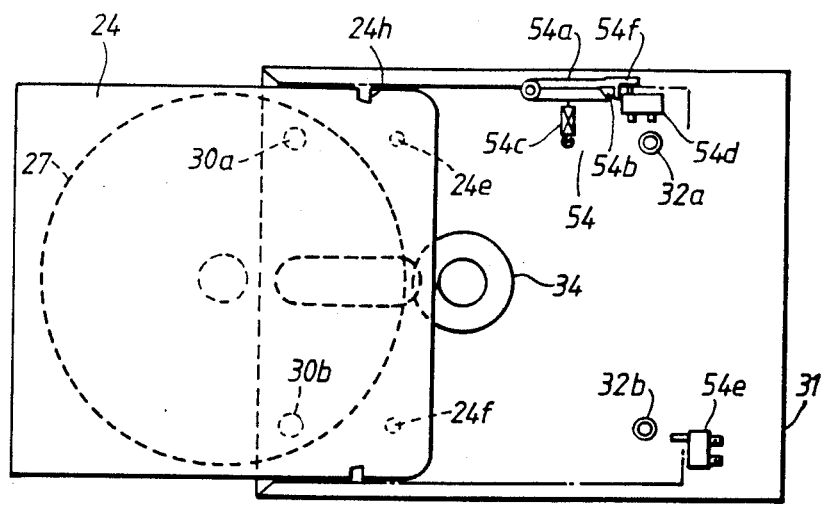
FIGS. 10(a), 10(b) and 10 (c) are flat views showing the working of the disc-case lock mechanism of FIG. 9.
Figure 10B:
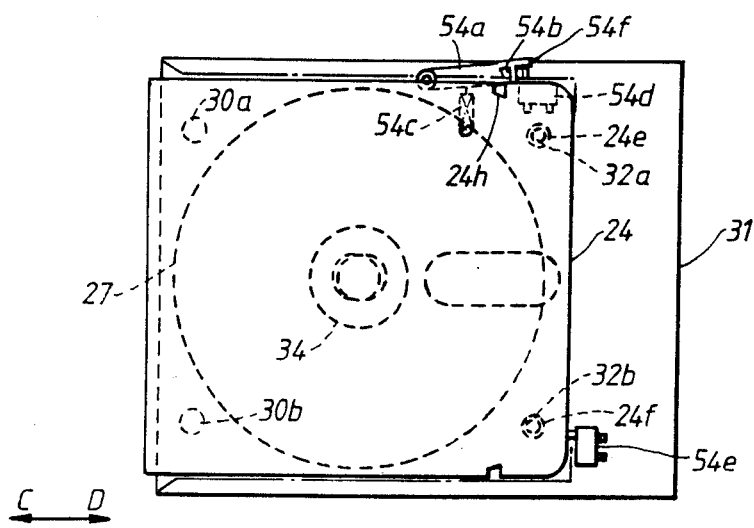
Figure 10C:
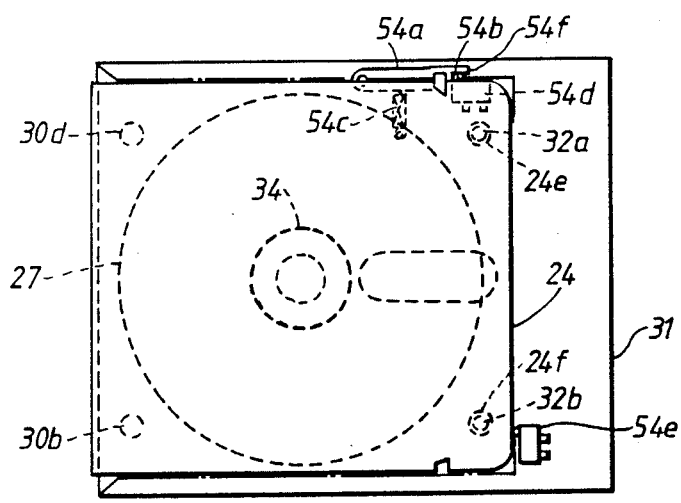
Figure 11:
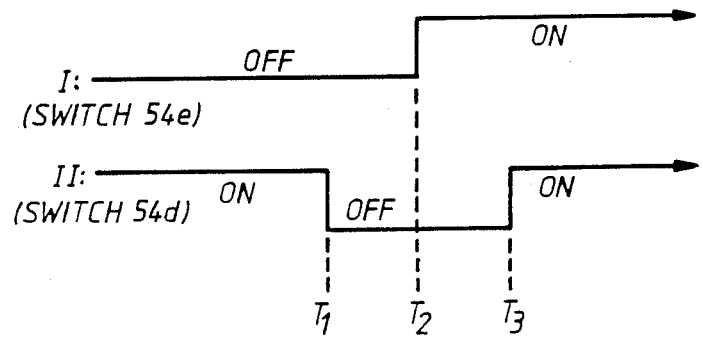
FIG. 11 is a timing diagram illustrating the operation of the disc-case lock mechanism of the CD player of FIG. 9.

Referring now to FIGS. 10(a), 10(b), 10(c) and 11, the operation of disc-case lock mechanism 54 will be described. Lock lever 54a is rocked in the clockwise direction when disc-case 24 is unloaded from disc compartment 23. In the loading operation of disc-case 24, lock lever 54a also is rocked in the clockwise direction until disc-case 24 reaches to a prescribed position in disc compartment 23, as shown in FIG. 10(a). Switch operation member 54f of lock lever 64a engages with lock detection switch 54d so that lock detection switch 54d is turned ON. lock lever 54a is rocked in the anti-clockwise direction by left side wall 24i against spring 54c when left side wall 24i of disc-case 24 engages with projection 54b, as shown in FIG. 10(b). Switch operation member 54f is disengaged from lock detection switch 54d due to the anti-clockwise rotation of lock lever 54a so that lock detection switch 54d is turned OFF. Lock lever 54a is rocked in the clockwise direction projection 54b when disc-case 24 reaches in its right position in disc compartment 23 for playback operation, as shown in FIG. 10(c). As a result, projection 54b fits into recess 24h of disc-case 24. Switch operation member 54f again engages with lock detection switch 54d so that lock detection switch 54d is again turned ON. Simultaneously, disc-case detection switch 54e also is turned ON by the engagement of rear wall 24g of disc-case 24 with disc-case detection switch 54e.

In the unloading operation of disc-case 24, the rear part of disc-case 24 is raised by sloped part 47d of second disc ejection lever 47, as described before in reference to FIGS. 6(a) to 6(c). Recess 24h of disc-case 24 then is disconnected from the engagement with projection 54b. As a result, disc-case 24 is unlocked from disc-case lock mechanism 54.

Referring now to FIG. 1, an erasure prevention mechanism 55 will be described. Erasure prevention mechanism 55 prohibits a recording mode operation for CDs in response to an erasure protection part 24j formed on rear wall 24g of disc-case 24. Erasure prevention mechanism 55 has a detection lever 55a which is rockably mounted to main chassis 31 in the left side of disc compartment 23 in the neighbor of ejection slider 44. Detection lever 55a has a projection 55b which corresponds to erasure protectin part 24j of disc-case 24 when disc-case 24 is loaded in disc compartment 23. Detection lever 55a also has a switch operation member 55c. An erasure prevention switch 55d is provided in the disc compartment 23 in correspondence to switch operation member 55c. Erasure protection part 24j is formed with a recess 24k on the prescribed portion of rear wall 24g and a flap member 24m which is removably provided to cover recess 24k. Flap member 24m prevents an intrusion of projection 55b of detection lever 55a into recess 24k. A spring 55e is suspended between detection lever 55a and main chassis 31 so that detection lever 55a is biased in the clockwise direction in the drawing. As a result, projection 54b engages with flap member 24m of disc-case 24 or enters into recess 24k when flap member 24m is removed. Erasure prevention switch 55d is turned ON when projection 55b engages with flap member 24m so that the recording mode operation is possible. While erasure prevention switch 55d is turned OFF when projection 55b enters into recess 24k due to the removal of flap member 24m so that the recording mode operation is prohibited. As a result, recorded data of CD 27 are prevented from erasure due to the recording mode operation when flap member 24m is removed.

Referring now to FIGS. 5(a) through 5(g), FIGS. 10(a) through 10(c) and FIG. 11, a loading operation of disc-case 24 will be described. When a user loads disc-case 24 in disc compartment 23 through disc loading slot 26a of front panel 26 disc-case 24 is guided by guide rails 28a 28b, support pins 30a, 30b, and positioning pins 32a, 32b in disc compartment 23 (see FIGS. 5(a), 5(b), 10(a), 10(b)). Disc-case 24 is pushed into disc compartment 23 by the user until it reaches its right position for playback operation (see FIGS. 5(c), 10(c)). Otherwise, disc-case 24 is automatically pulled into the right position by any suitable automatic loading mechanism (not shown). Left side wall 24i of disc-case 24 turns OFF lock detection switch 54d at the time T1, as shown in the Graph I of FIG. 11, when disc-case 24 reaches a prescribed position, as shown in FIG. 10(b). Then, rear wall 24g of disc-case 24 turns ON disc-case detection switch 54e at the time T2, as shown in the Graph II of FIG. 11. Lock detection switch 54d is again turned ON at the time T3, as shown in the Graph I of FIG. 11, when disc-case 24 reaches the right position for playback operation, as shown in FIG. 10(c). In response to the ON states of lock detection switch 54d and disc-case detection switch 54e, cam drive motor 40 is activated so that cam member 39 is rotated through worm gear 40a and idler gear 41. Then, front end 38d of elavation lever 38 follows rotary cam 39b of cam member 39 so that elavation lever 38 is rocked in the anti-clockwise direction by the biasing force of spring 38c (see FIGS. 3(a), 3(b)). Rear end 38a of elavation lever 38 pushes up rotor 36b of motor 36 in the direction of arrow A. Turntable 34 enters into disc-Case 24 through aperture 24b and engages with CD 27. As a result, turntable 34 clamps CD 27 with clamper 35, as described before.

In response to the upward movement of turntable 34 or rotor 36b, optical pickup 48 is unlocked from pickup lock mechanism 53, as described before. Therefore, optical pickup 48 is brought into the state in that optical pickup 48 is able to move radially in respect to CD 27 for playback operation.

Figure 5B:
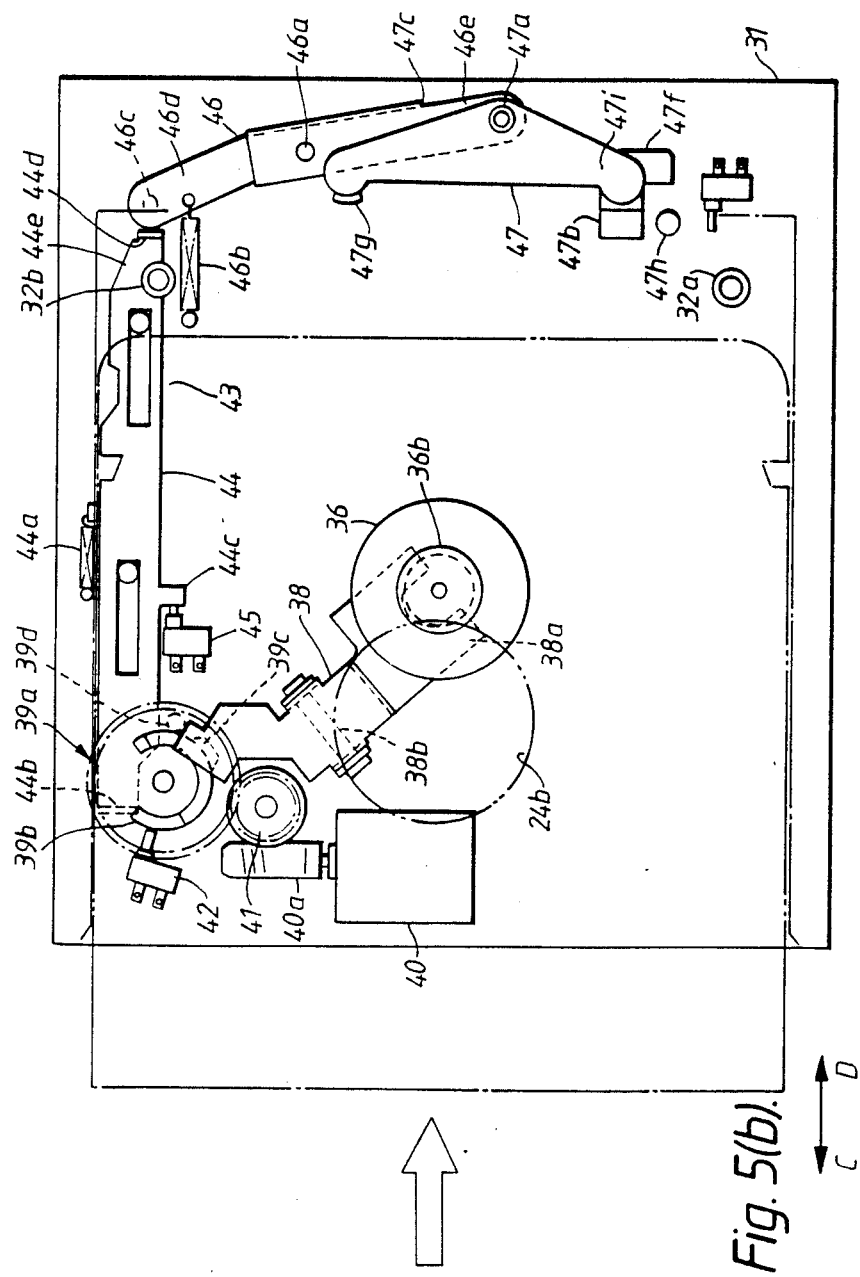
Figure 5C:
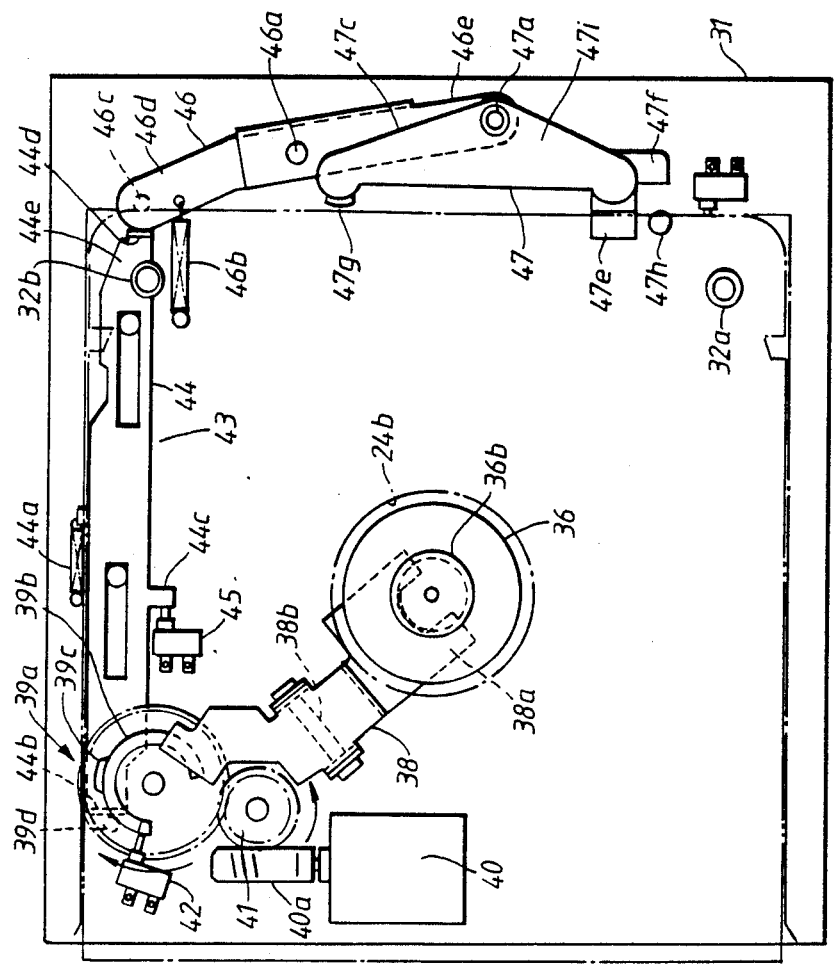
Figure 5D:
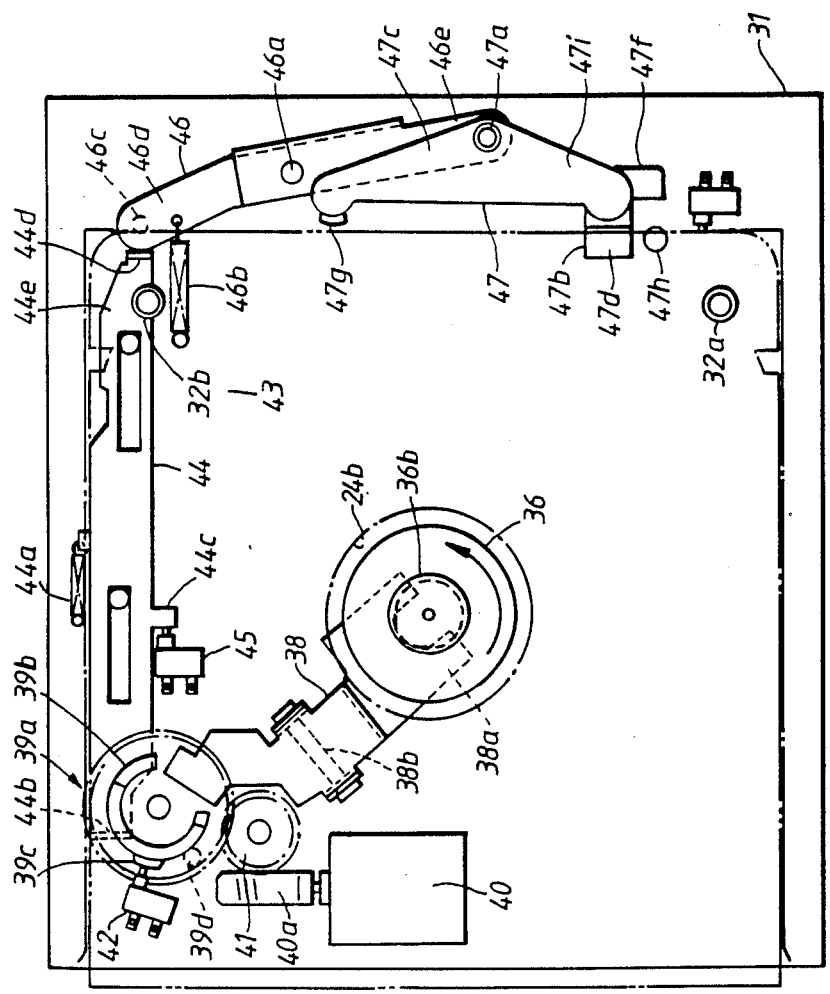
Figure 5E:
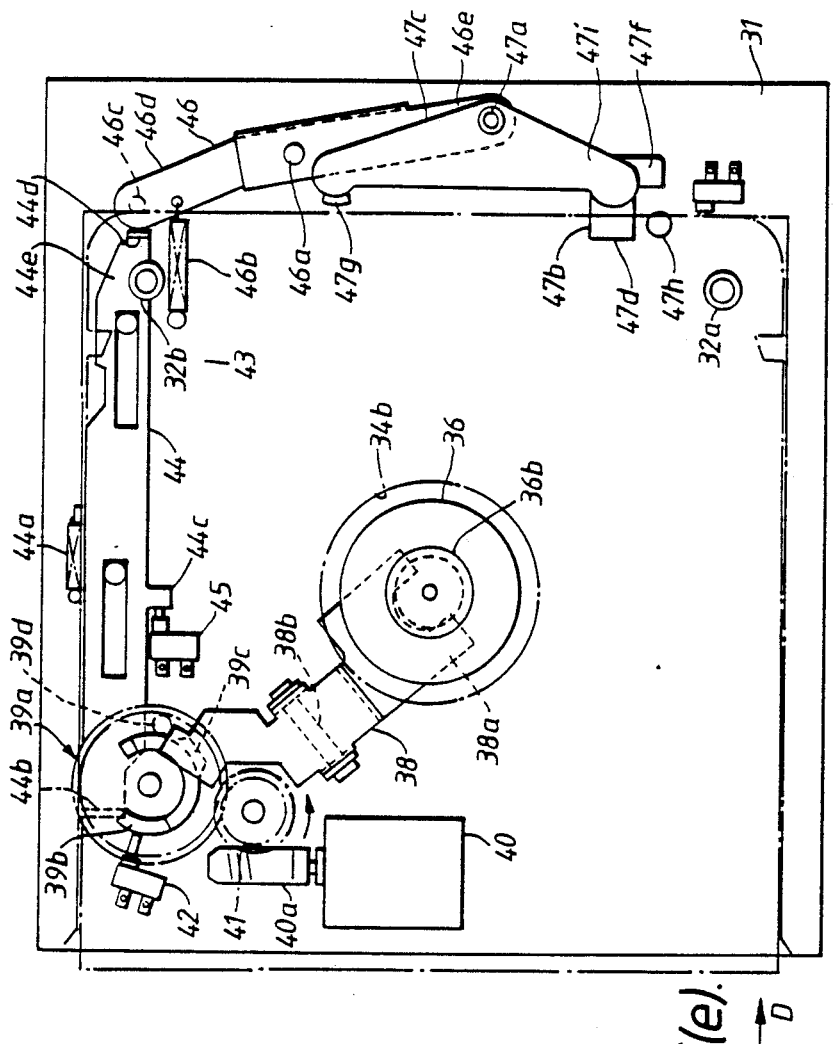
Figure 5F:
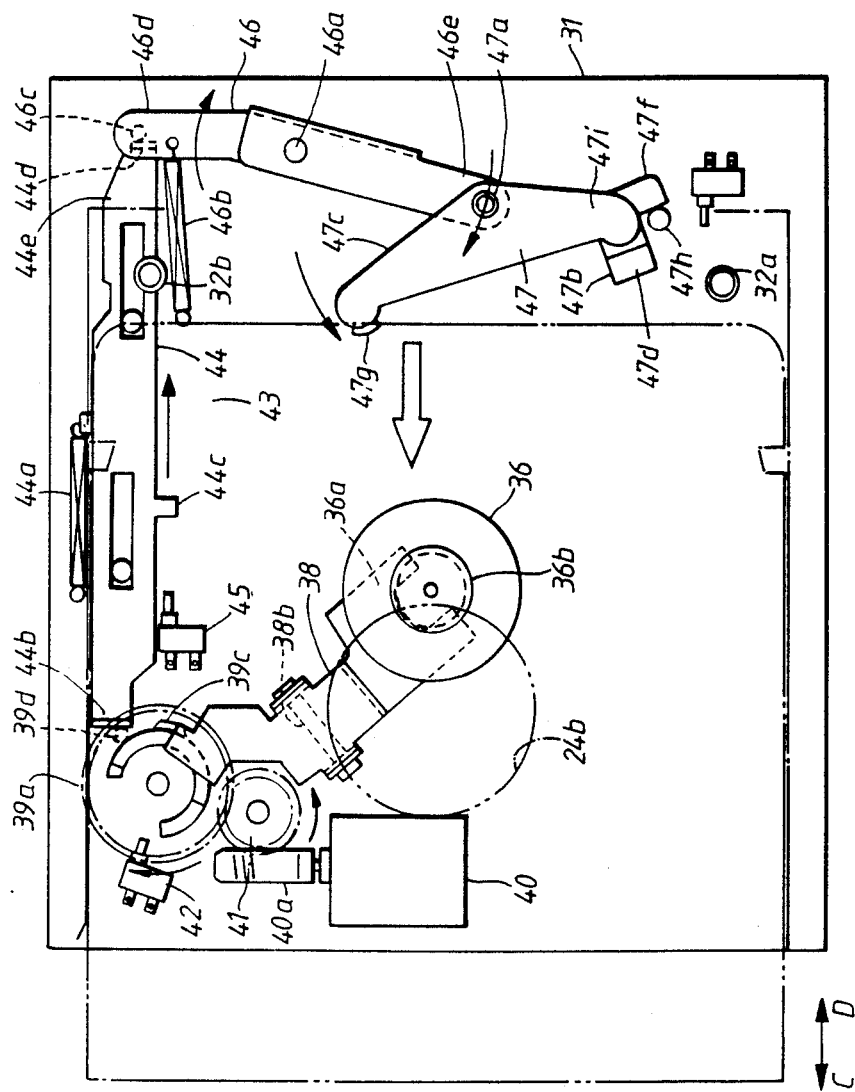
Figure 5G:
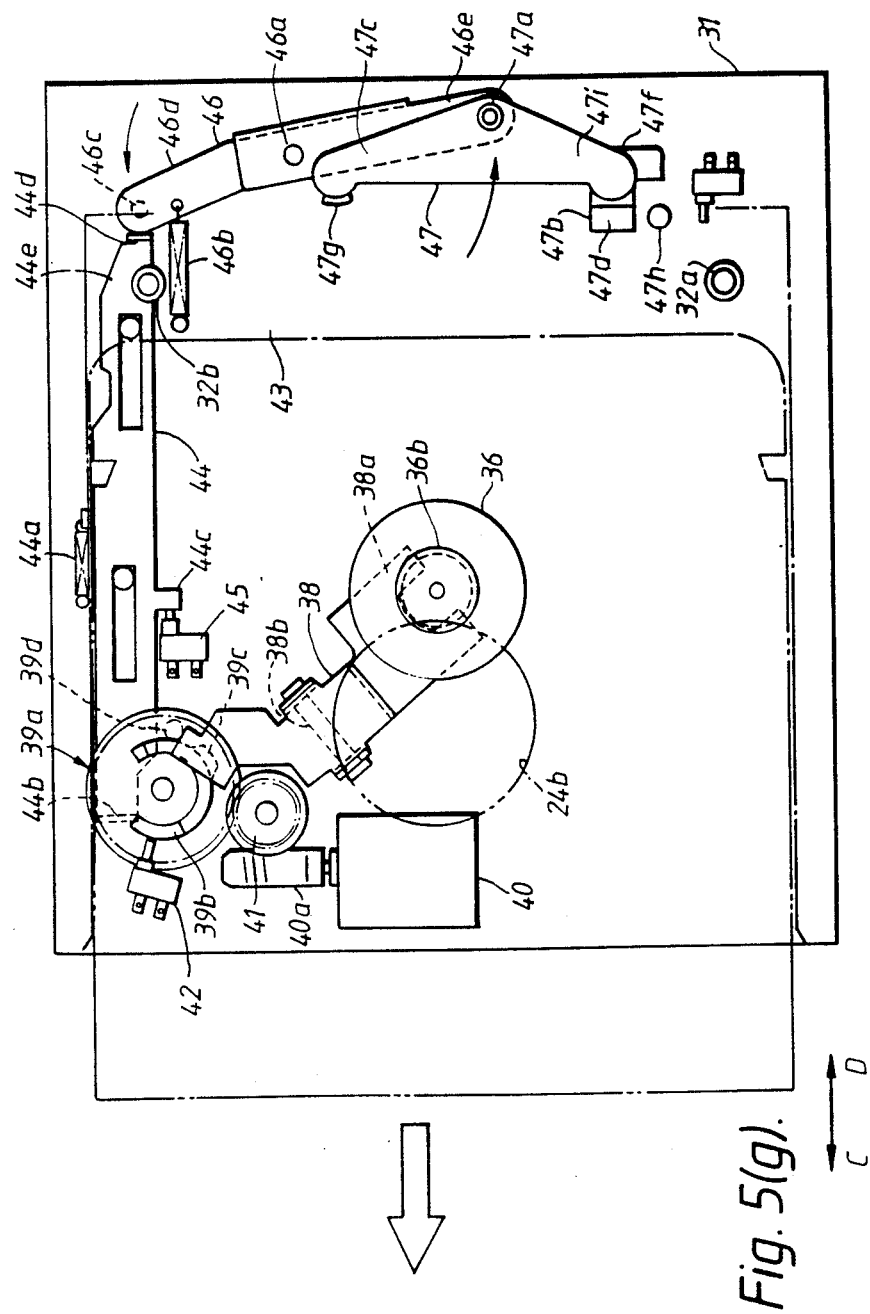

When the upward movement of turntable 34 has been completed, switch operation boss 39c of cam member 39 activates mode detection switch 42 so that cam drive motor 40 is stopped (see FIG. 5(d)). Therefore, turntable 34 is maintained in the raised position. After the above operation has been completed, the user operates a playback key or button of the player so that the playback operation or the recording operation for CD 27 starts. That is, motor 36 rotates CD 27 through turntable 34 and optical pickup 48 is moved for tracing CD 27 by actuator 49, as described before.

Referring now to FIGS. 5(a) through 5(g), FIGS. 10(a) through 10(c) and FIG. 11, an ejecting operation of disc-case 24 will be described. When a user operates loads disc-case 24 in disc compartment 23 through disc loading slot 26a of front panel 26, disc-case 24 is guided by guide rails 28a, 28b, support pins 30a, 30b and positioning pins 32a, 32b in disc compartment 23 see FIGS. 5(a), 5(b), 10(a), 10(b)). Disc-case 24 is pushed into disc compartment 23 by the user until it reaches its right position for playback operation (see FIGS. 5(c), 10(c)). Otherwise, disc-case 24 is automatically pulled into the right position by any suitable automatic loading mechanism (not shown). Left side wall 24i of disc-case 24 turns OFF lock detection switch 54d at the time T1, as shown in the Graph I of FIG. 11, when disc-case 24 reaches a prescribed position, as shown in FIG. 10(b). Then, rear wall 24g of disc-case 24 turns ON disc-case detection switch 54e at the time T2, as shown in the Graph II of FIG. 11. Lock detection switch 54d is again turned ON at the time T3, as shown in the Graph I of FIG. 11, when disc-case 24 reaches the right position for playback operation, as shown in FIG. 10(c). In response to the ON states of lock detection switch 54d and disc-case detection switch 54e, cam drive motor 40 is activated so that cam member 39 is rotated through worm gear 40a and idler gear 41. Then, front end 38d of elavation lever 38 follows rotary cam 39b of cam member 39 so that elavation lever 38 is rocked in the anti-clockwise direction by the biasing force of spring 38c (see FIGS. 3(a), 3(b)). Rear end 38a of elavation lever 38 pushes up rotor 36b of motor 36 in the direction of arrow A. Turntable 34 enters into disc-case 24 through aperture 24b and engages with CD 27. As a result, turntable 34 clamps CD 27 with clamper 35, as described before.

In response to the upward movement of turntable 34 or rotor 36b, optical pickup 48 is unlocked from pickup lock mechanism 53, as described before. Therefore, optical pickup 48 is brought into the state in that optical pickup 48 is able to move radially in respect to CD 27 for playback operation.

When the upward movement of turntable 34 has been completed, switch operation boss 39c of cam member 39 activates mode detection switch 42 so that cam drive motor 40 is deactivated (see FIG. 5(d)). Therefore, turntable 34 is maintained in the upward position during the playback operation.

As described above, this invention provides, particularly in the field of devices for the playback of optical discs on which data have been recorded in digital form, an optical disc record player of simple construction but permitting use of sophisticated control facilities that can be implemented reliably and can contribute thereby to greater convenience for the user.

It will be apparent to those skilled in the art that modifications and variatiOns can be made to the optical disc player of this invention. In particular, the invention is applicable to an optical disc player for unpacked discs as well as an optical disc player for discs packed in disc-cases. It also can be applicable to an optical disc player in which a clamper moves in respect to a turntable for clamping disc. It also can be used with discshaped information strorage media other than compact audio discs, fro example, with vido discs. The invention in its broader aspects is, therefore, not limited to the specific details and illustrated examples shown and described. Accordingly, departure can be made from such details without departing from the spirit of the general inventive concept.

What is claimed is:

1. A turntable elevation apparatus for an optical disc player, said optical disc player including a disc compartment in a main chassis for accommodating an optical disc case, the optical disc case including an optical disc rotatably disposed therein, the apparatus comprising:

disc holding means for holding the optical disc accommodated in the disc compartment, said disc holding means including turntable means for removably supporting and rotating an optical disc and clamper means for holding the optical disc to said turntable means, said turntable means having a hold position when the optical disc is held between said clamper means and said turntable means and a release position when the optical disc is released by said clamper means and said turntable means;

disc rotation drive means for rotating said turntable means, said disc rotation drive means including a turntable shaft fixed to said turntable means and a motor capable of rotating said turntable shaft, said turntable shaft being translatable along the axis of said turntable shaft to move said turntable means between said hold position and said release position; and elevator means for controllably elevating said turntable means from said release position to said hold position including a cam member rotatably supported on the main chassis including a gear and a rotary cam, a motor capable of engaging said gear for imparting a rotational movement to said cam member, and an elevation member rotatably supported by said main chassis at a rotation point, said elevation member having a first end in sliding engagement with said rotary cam and a second end in rotatable engagement with said turntable shaft, said elevation member rotating about said rotation point as said cam member rotates thus translating said turntable shaft along the axis of said turntable shaft to move said turntable means between said hold position and said release position.

2. An apparatus as recited in claim 1, further including a mode detection switch in mechanical communication with said cam member for outputting a release detection signal and a hold detection signal when said cam member is rotated to thus rotate said elevation member about said rotation point to place said turntable means in said release and said hold positions, respectively.

3. A turntable elevation apparatus as recited in claim 1, further including a rotor at the end of said turntable shaft distal of said turntable means, said second end of said elevation member being in rotatable engagement with said rotor.

* * * * *